(12) United States Patent
Sannerud

(10) Patent No.: US 8,457,966 B2
(45) Date of Patent: *Jun. 4, 2013

(54) METHOD AND SYSTEM FOR PROVIDING SPEECH RECOGNITION

(75) Inventor: David Sannerud, Castle Rock, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/308,032

(22) Filed: Nov. 30, 2011

(65) Prior Publication Data
US 2012/0143609 A1 Jun. 7, 2012

Related U.S. Application Data

(63) Continuation of application No. 11/526,395, filed on Sep. 25, 2006.

(51) Int. Cl.
*G10L 15/04* (2006.01)
*G10L 21/00* (2006.01)
*H04M 1/64* (2006.01)

(52) U.S. Cl.
USPC ........ 704/251; 704/270; 704/275; 379/88.01; 379/88.02

(58) Field of Classification Search
USPC ............... 704/251, 270, 275, 240; 379/88.01, 379/88.02
See application file for complete search history.

(56) References Cited

U.S. PATENT DOCUMENTS

| | | | |
|---|---|---|---|
| 5,638,425 A | 6/1997 | Meador et al. | |
| 5,897,616 A | 4/1999 | Kanevsky et al. | |
| 6,173,266 B1* | 1/2001 | Marx et al. | 704/270 |
| 6,208,965 B1 | 3/2001 | Brown et al. | |
| 6,389,397 B1 | 5/2002 | Otto | |
| 6,483,896 B1 | 11/2002 | Goldberg et al. | |
| 6,510,411 B1 | 1/2003 | Norton et al. | |
| 6,728,348 B2* | 4/2004 | Denenberg et al. | 379/93.18 |
| 6,731,731 B1 | 5/2004 | Ueshima | |
| 6,816,578 B1 | 11/2004 | Kredo et al. | |
| 6,882,973 B1* | 4/2005 | Pickering | 704/270 |
| 6,934,684 B2 | 8/2005 | Alpdemir et al. | |
| 7,031,925 B1 | 4/2006 | Goldberg | |
| 7,062,018 B2 | 6/2006 | Martin et al. | |
| 2002/0072917 A1 | 6/2002 | Irvin et al. | |
| 2003/0125944 A1 | 7/2003 | Wohlsen et al. | |
| 2004/0240633 A1 | 12/2004 | Sloan | |
| 2005/0144014 A1 | 6/2005 | Janke et al. | |
| 2005/0144187 A1* | 6/2005 | Che et al. | 707/101 |
| 2005/0177376 A1 | 8/2005 | Cooper et al. | |
| 2006/0217978 A1* | 9/2006 | Mitby et al. | 704/251 |

\* cited by examiner

*Primary Examiner* — Eric Yen

(57) ABSTRACT

An approach for providing speech recognition is disclosed. A name is retrieved from a user based on data provided by the user. The user is prompted for a name of the user. A first audio input is received from the user in response to the prompt. Speech recognition is applied to the first audio input using a name grammar database to output a recognized name. A determination is made whether the recognized name matches the retrieved name. If no match is determined, the user is re-prompted for the name of the user for a second audio input. Speech recognition is applied to the second audio input using a confidence database having entries less than the name grammar database.

20 Claims, 6 Drawing Sheets

METHOD AND SYSTEM FOR PROVIDING SPEECH RECOGNITION

This application is a continuation of U.S. patent application Ser. No. 11/526,395 filed on Sep. 25, 2006, the entirety of which is incorporated herein by reference.

BACKGROUND INFORMATION

Speech recognition plays an important role in communication systems, for both gathering and supplying information to users. Traditionally, interactive voice response (IVR) systems have relied upon a combination of dual-tone multi-frequency (DTMF) and speech inputs to acquire and process information. However, for complicated transactions requiring a quantity of numbers, letters, and words to be input, the concept of an IVR system has been more appealing than its conception. Namely, typical DTMF interfaces have proven to be impractically slow for complex data entry. As such, organizations are becoming ever reliant upon voice based systems to augment DTMF inputs. Unfortunately, voice based systems have introduced new, more challenging issues pertaining to the intricacies of spoken language and the infinite variations on human utterance. Accordingly, IVR systems implementing speech recognition technology have proven to be unacceptably inaccurate at converting a spoken utterance to a corresponding textual string or other equivalent symbolic representation.

Therefore, there is a need for an improved approach for providing speech recognition.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF PREFERRED EMBODIMENTS

An apparatus, method, and software for providing speech recognition are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various embodiments of the present invention are described with respect to speech recognition of a pro-noun (e.g., name), it is contemplated that these embodiments have applicability to generalized speech recognition using equivalent interfaces and operations.

Figure 1:
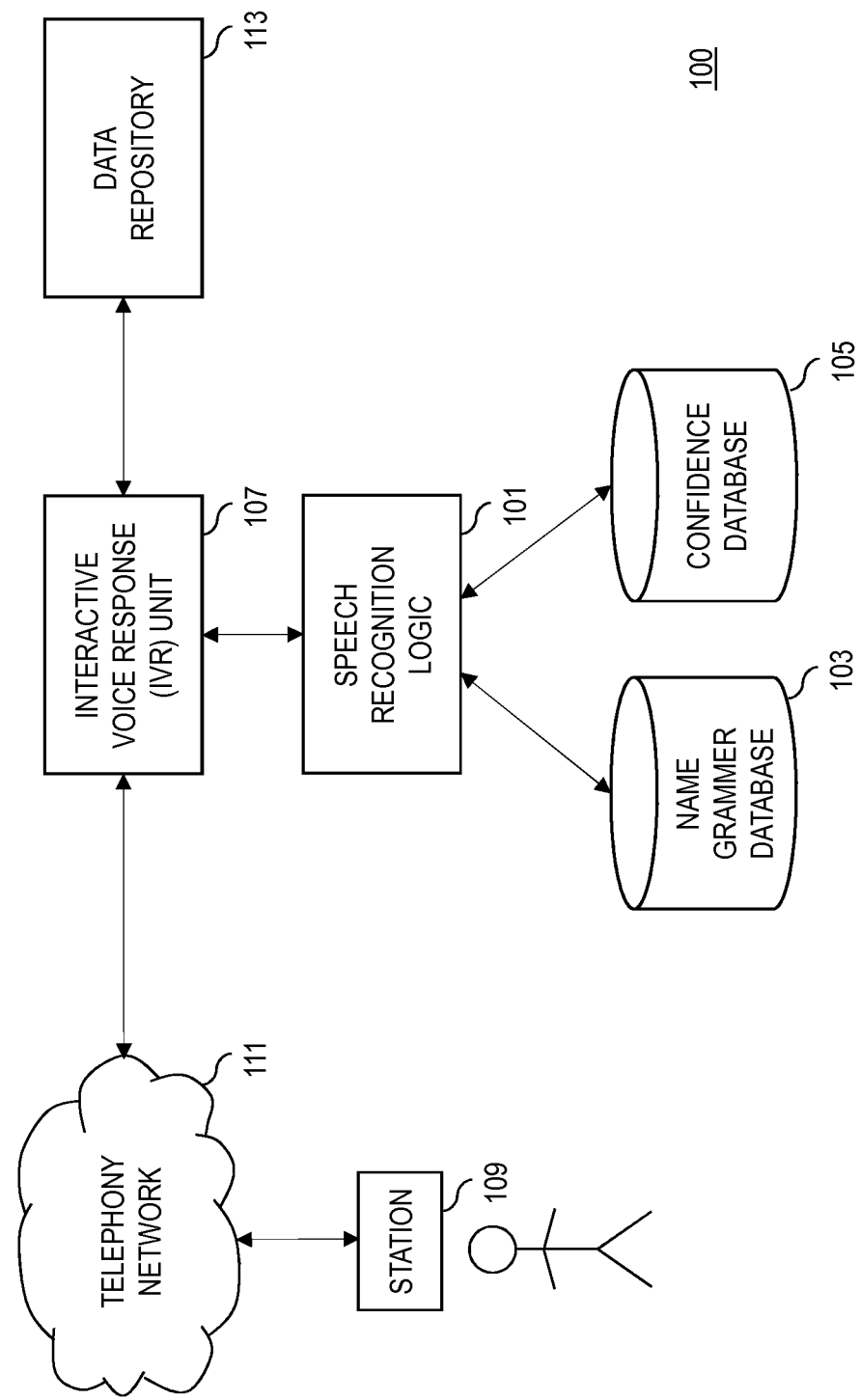
FIG. 1 is a diagram illustrating a communication system capable of providing speech recognition to acquire a name, in accordance with an embodiment of the present invention.

FIG. 1 is a diagram illustrating a communication system capable of providing speech recognition to acquire a name, in accordance with an embodiment of the present invention. A communication system 100 includes a speech recognition system (or logic) 101 that utilizes a name grammar database 103, a confidence database 105. The speech recognition system 101 operates with an interactive voice response (IVR) unit (or system) 107, which receives a voice call from a station 109 over a telephony network 111. The telephony network 111 can be a circuit-switched system or a packetized voice network (e.g., Voice over Internet Protocol (VoIP) network). The packetized voice network 111 can be accessed by a suitable station 109—e.g., computer, workstation, or other device (e.g., personal digital assistant (PDA), etc.) supporting microphone and speaker functionality. The IVR system 107, among other functions, collects and provides data to users. The IVR system 107 is more fully explained in FIG. 2. Data collection is supported by a data repository 113.

For the purposes of illustration, the speech recognition system 101 is described with respect to the recognition of audio signals representing names. A user's name is arguably the most routinely gathered, commonly used piece of information. Unfortunately, acquiring a user's name can be a difficult task for conventional systems, which utilize dual-tone multi-frequency (DTMF) input interfaces. For instance, DTMF interfaces become increasingly more impractical as the quantity of letters contained within an individual's name increases. Also, many phone designs (notably cellular phones) require the speaker and the dial-pad to be constructed together, such that it is convenient for the user to use the dial-pad and listen to voice prompts. As a result, speech recognition have been introduced to supplement DTMF interfaces.

Traditional speech recognition interfaces are highly dependent upon grammatical context and ordinary pronunciation rules to achieve accurate conversion results. However, with user names (or any proper nouns), these techniques have proven to be inadequate because these types of words generally have no significant grammatical context that can be used to differentiate among possible conversion alternatives. Further, ordinary pronunciation rules provide little, if any, beneficial value since proper nouns contain a disproportionately large number of nonstandard pronunciation variations. Thus, phonetic variability is exemplified not only by the loss of context but also by the acoustic differences between phonemes themselves.

Further, speech recognition technology is hindered by a set of characteristic complexities independent from the types of utterances being converted. For instance, acoustic variability introduced by environmental background noise, microphone positioning, as well as transducer quality, add to the loss of conversion accuracy. In addition, speaker variability resulting from physical and emotional states, speaking rates, voice quality and intensity, sociolinguistic background, dialect, as well as vocal tract size and shape also contribute to the loss of recognition accuracy.

Returning to FIG. 1, the speech recognition system 101, which is more fully described below with respect to FIG. 3, can support a myriad of applications involving interaction with a human user, such as call flow processing, directory assistance, commerce transactions (e.g., airline ticketing, stock brokering, banking, order placement, etc.), browsing/collecting information, and the like.

Although not shown, the IVR system 107 can access the data repository 113 via a data network, which can include a local area network (LAN), a wide area network (WAN), a cellular or satellite network, the Internet, etc. Further, those of ordinary skill in the art will appreciate that data repository 113 can be directly linked to or included within IVR system 107. As such, data repository 113 can be any type of information store (e.g., database, server, computer, etc) that associates personalized information with user names. This personalized information can include any one or combination of a birth date, an account number (e.g., bank, credit card, billing codes, etc.), a social security number (SSN), an address (e.g., work, home, internet protocol (IP), media access control (MAC), etc.), telephone listing (home, work, cellular, etc.), as well as any other form of uniquely identifiable datum, e.g., biometric code, voice print, etc.

In one embodiment of the present invention, the data repository 113 is configured to allow reverse searching for a user's name using one or more of the above listed personalized information forms. Moreover, data repository 113 can be automatically updated and maintained by any source, including third party vendors.

Although the speech recognition system 101 is shown as a separate component, it is contemplated that the speech recognition system 101 can be integrated with the IVR system 107.

Figure 2:
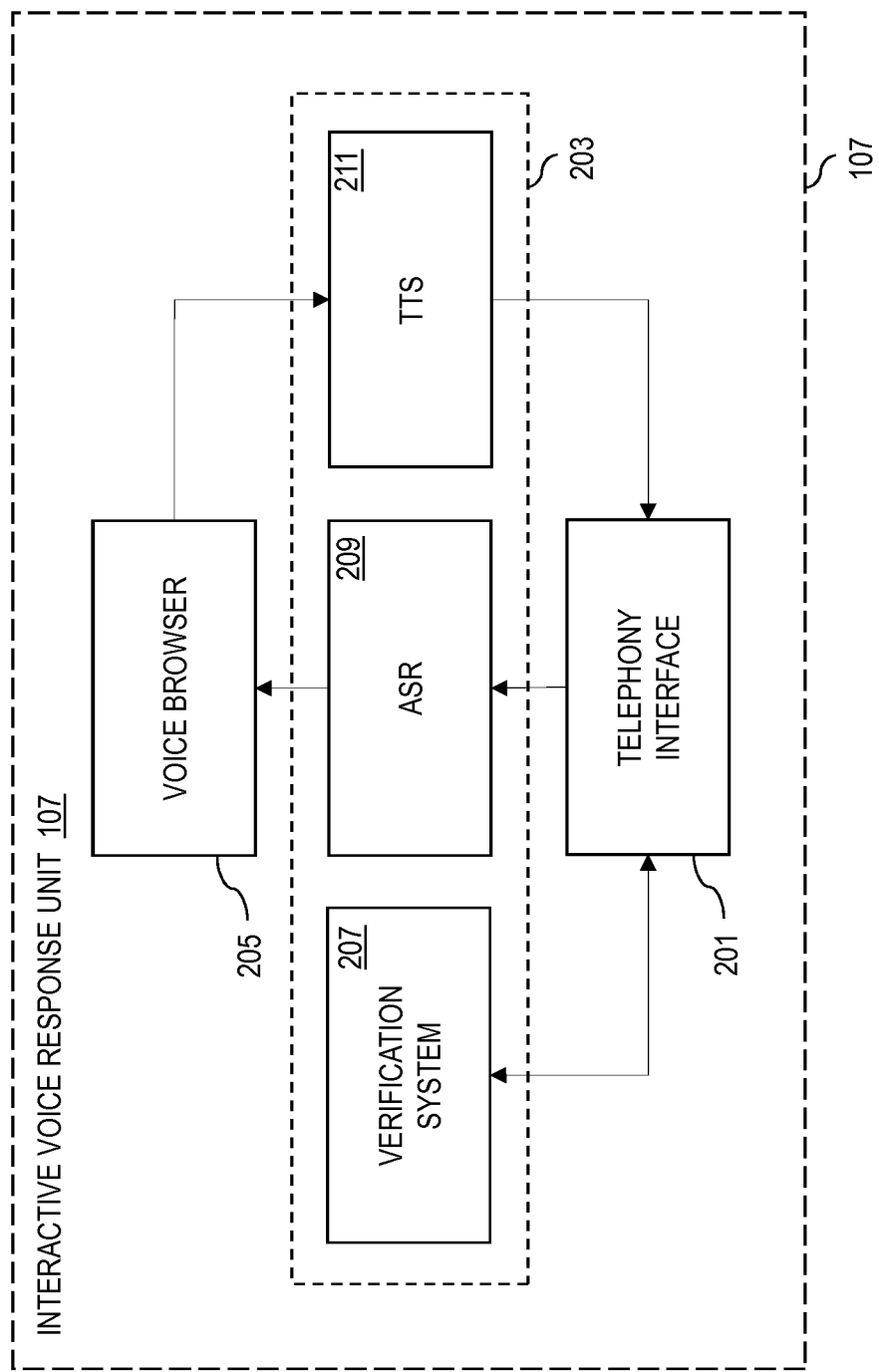
FIG. 2 is a diagram of an exemplary interactive voice response (IVR) unit, according to an embodiment of the present invention.

FIG. 2 is a diagram of an exemplary interactive voice response (IVR) system, according to an embodiment of the present invention. In this example, the IVR system 107 includes a telephony interface 201, a resource manager 203, and a voice browser 205. The IVR system 107 utilizes the telephony interface 201 for communicating with one or more users over the telephony network 111. In alternative embodiments, other interfaces are utilized depending on the access method of the user. Moreover, although the IVR system components are shown as separate, distributed entities, the IVR system 107 can incorporate some or all of the functionalities into a single network element.

As shown, the resource manager 203 provides various speech resources, such as a verification system 207, an automatic speech recognizer (ASR) 209, and a text-to-speech (TTS) engine 211. The TTS engine 211 converts textual information (digital signal) from the voice browser 205 to speech (analog signal) for playback to a user. The TTS engine 211 accomplishes this transition through a front-end input and a back-end output. The input converts raw text into its written-out word equivalent through text normalization, pre-processing, and/or tokenization. Words are then assigned phonetic transcriptions and divided into prosodic units, e.g., phrases, clauses, and/or sentences. Using this combination of phonetic transcriptions and prosody arrangements, the front-end input communicates a symbolic linguistic representation to the back-end output for synthesizing. Based on the desired level of naturalness or intelligibility, the back-end output is capable generating speech waveforms through any one of the following synthesis processes: concatenative, unit selection, diphone, domain-specific, formant, articulatory, Hidden Markov Model (HMM), and other like methods, as well as any hybrid combination thereof. Through the synthesis process, the back-end output generates the actual sound output transmitted to user.

The ASR 209 can effectively behave as the speech recognition system 101, or alternatively be an interface to the speech recognition system 101; the particular embodiment depends on the application. The ASR 209 effectively converts a user's spoken language (represented by analog signals) into textual or an equivalent symbolic form (digital signal) for processing by the voice browser 205 and/or verification system 207.

The voice browser 205 can play pre-recorded sound files to the user in lieu of, or in addition to, use of the TTS engine 211. According to one embodiment of the present invention, the resource manager 203 can include an analog-to-digital and digital-to-analog converter (not shown) for signaling between the station 109, for example, and the voice browser 205. Further, in alternative embodiments, the voice browser 205 may contain speech recognition and synthesis logic (not shown) that implements the above, thereby extracting meaning from the user's spoken utterances and producing acoustic renditions of text directly.

The verification system can be linked to the telephony interface 201, the ASR 209, or both components depending upon the method of authentication desired. Accordingly, a user name, password, code, or other unique identification can be required by the verification system 207 for limiting access to the voice browser 205. In this manner, users can be required to provide this information using either spoken utterances transmitted through the ASR 209 or DTMF signals transmitted via telephony interface 201. Alternatively, the verification system 207 can provide an unobtrusive level of security by positively identifying and screening users based on their voice prints transmitted from telephony interface 201. Thus, in either embodiment, the verification system 207 can keep sensitive transactions secure.

The voice browser 205 functions as a gateway between a call, for example, and a variety of networked applications. The voice browser 205 can employ a microphone, keypad, and a speaker instead of a keyboard, mouse, and monitor of a conventional web-based system. The voice browser 205 processes pages of markup language, such as voice extensible markup language (VoiceXML), speech application language tags (SALT), hypertext markup language (HTML), and others such as wireless markup language (WML) for wireless application protocol (WAP) based cell phone applications, and the World Wide Web (W3) platform for handheld devices, residing on a server (not shown). Since a broad level of markup languages are supported, the voice browser 205 can be configured accordingly, to include a VoiceXML-compliant browser, a SALT-complaint browser, an HTML-compliant browser, a WML-complaint browser or any other markup-language complaint browser, for communicating with users. As with standard web services and applications, the voice browser 205 can utilize a standardized networked infrastructure, i.e., hypertext transport protocol (HTTP), cookies, web caches, uniform resource locators (URLs), secure HTTP, etc., to establish and maintain connections.

Figure 3:
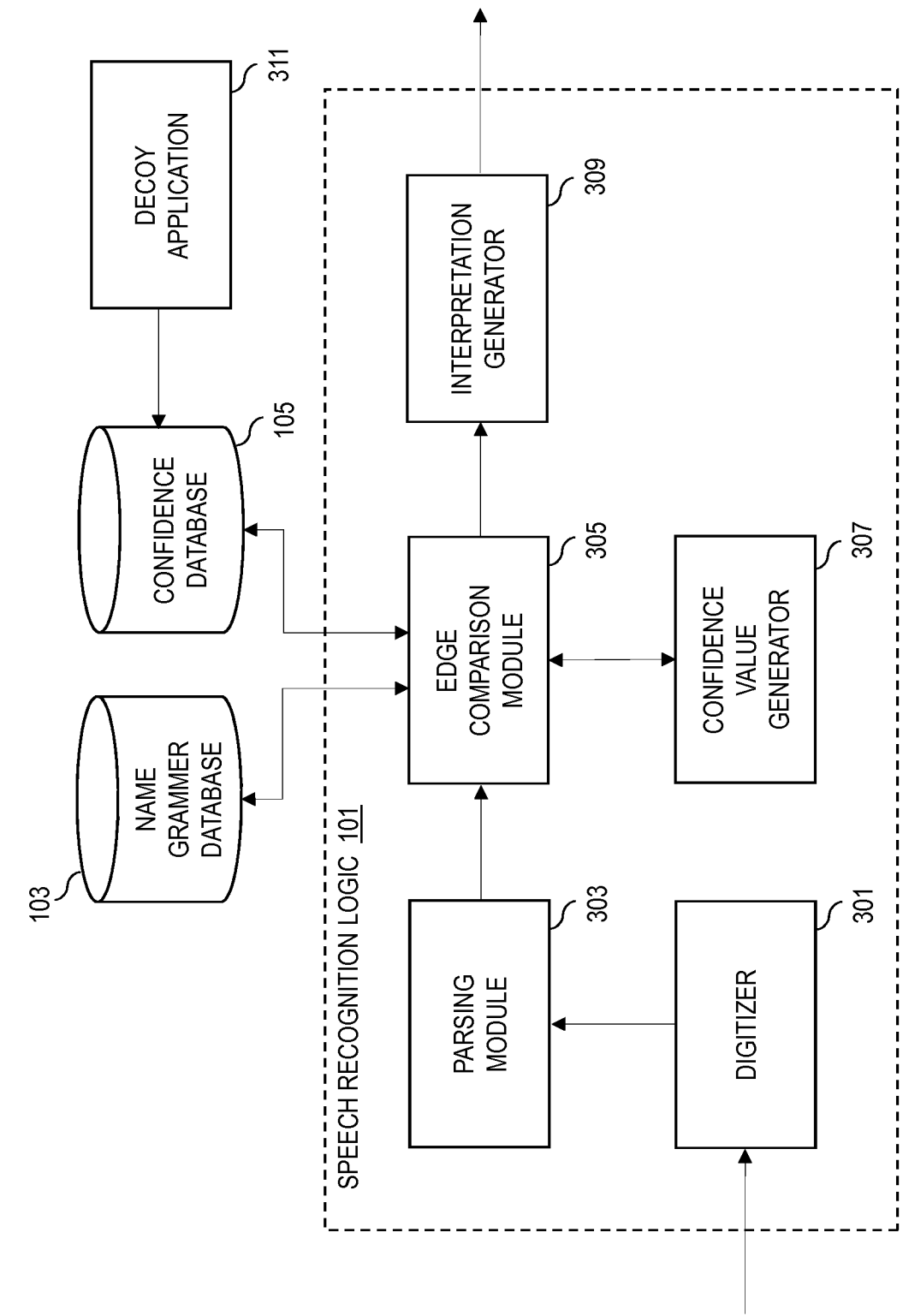
FIG. 3 is a diagram of a speech recognition system, in accordance with an embodiment of the present invention.

FIG. 3 is a diagram of a speech recognition system, in accordance with an embodiment of the present invention. The speech recognition system 101 can provide speaker dependent and/or independent automatic voice recognition of acoustic utterances from the user. Accordingly, the speech recognition system 101 processes voice communications transmitted over telephony network 111 to determine whether a word or a speech pattern matches any grammar or vocabulary stored within a database (e.g., name grammar database 103 or confidence database 105). The name grammar database 103 is populated with possible combinations of user names and spellings of those names. According to one embodiment of the present invention, the name grammar database 103 can be built according to the NUANCE™ Say and Spell name grammar.

In alternative embodiments, the database 103 can include any grammar database including names and spellings of those names as well as a dictionary database, another grammar database, an acoustic model database, and/or a natural language definition database. Dictionary databases contain phonetic pronunciations for words used in grammar databases. Acoustic model databases define, among other things, the languages that the speech application utilizes.

Moreover, while only one name grammar database 103 and one confidence database are shown, it is recognized that multiple databases may exist controlled by, for instance, a database management system (not shown). In a database management system, data is stored in one or more data containers, each container contains records, and the data within each record is organized into one or more fields. In relational database systems, the data containers are referred to as tables, the records are referred to as rows, and the fields are referred to as columns. In object-oriented databases, the data containers are referred to as object classes, the records are referred to as objects, and the fields are referred to as attributes.

As seen in FIG. 3, a supplemental grammar database 105, denoted as "confidence database," is used in conjunction with the name grammar database 103 to produce accurate recognition of user names. The confidence database 105, in an exemplary embodiment, can be derived from the primary name grammar database 103, such as an N-best list (with N being an integer that can be set according to the particular application). The N-Best result can include the expected name result that would increase recognition. In other words, the N-Best result is a list of items returned from the grammar that correlate well to the caller's utterance. The N-Best list is sorted by likelihood of a match and includes one or more entries. In this process, the correct name is added to this N-Best supplemental grammar. According to one embodiment, there is no weighting or preference given to any item in this supplemental name grammar. This smaller subset of the full name grammar containing both decoy and the correct name will allow for a better recognition of the caller's name. This supplemental grammar database can be dynamically built, in accordance with one embodiment of the present invention.

A decoy application 311 is utilized, according to an exemplary embodiment, to generate variations of the names within the N-best list to enhance the probability of recognition. These generated names, which can possibly include the correct name, are provided as additional entries into the confidence database 105.

The speech recognition system 101 is configured to process acoustic utterances to determine whether a word or speech pattern matches any name stored within the name grammar database 103 and/or the confidence database 105. When a match is identified for a particular utterance (or set of utterances) of the voice communication, the speech recognition system 101 sends an output signal for implementation by the verification system 207 and/or the voice browser 205. Thus, it is contemplated that the speech recognition system 101 can include speaker dependent and/or independent voice recognition. Further, the speech recognition system 101 can be implemented by any suitable voice recognition system capable of detecting and converting voice communications into text or other equivalent symbolic representations.

As such, the speech recognition system 101 includes a digitizer 301 for digitizing an audio input (e.g., speech), a parsing module 303, and an edge comparison module 305, as well as a confidence value generator 307 and interpretation generator 309. Moreover, the speech recognition system 101 makes use of the name grammar database 103, confidence database 105 to aid in more accurately recognizing a user's name; this process is more fully described with respect to FIGS. 4A and 4B.

In operation, the digitizer 301 accepts acoustic or audio signals (i.e., user utterances) from the telephony interface 201 and coverts them into digital signals through an analog-to-digital converter. Once digitized, the signal is converted into the frequency domain using known methods, e.g., discrete/fast/short form Fourier transform, etc., and combined into a frequency spectrum frame for further processing. Since the human ear can only perceive audible acoustics ranging from 20 Hz to 20 kHz and since the human voice only typically produces utterances within the 500 Hz to 2 kHz range, the digitizer 301 can be optimized to operate within these ranges. It is noted the digitizer 301 can include a host of signal processing components, i.e., filters, amplifiers, modulators, compressors, error detectors/checkers, etc., for conditioning the signal, e.g., removing signal noises like ambient noise, canceling transmission echoing, etc.

After the digitizer 301 processes the analog signal, a corresponding digital signal is passed to the parsing module 303 for extracting acoustic parameters using known methods, e.g., linear predictive coding. For instance, the parsing module 303 can identify acoustic feature vectors that includes cepstral coefficients that identify the phonetic classifications and word boundaries of a user's utterance. It is recognized that other conventional modeling techniques can be used to extract one or more characteristics and/or patterns that classify distinctive acoustic portions of the digital signal.

Once parsed, the various acoustic features defined by the parsing module 303 are input into the edge comparison module 309 for comparison with and identification as recognized words, i.e., first, middle, and/or last names of the user. Accordingly, the edge comparison module 305 can use any known speech recognition method and/or algorithm, e.g., hidden Markov Modeling (HMM), as well as the name grammar database 103 and the confidence database 105 to recognize user utterances as words. After the words are identified, the interpretation generator 309 passes an associated equivalent textual or symbolic representation (hereinafter collectively referred to as a "value") to the voice browser 205 and/or verification system 207 for appropriate processing.

In general, a grammar database stores all the possible combinations of user utterances, and associated values, that are validly accepted by a particular speech application. By way of example, a simple grammar, denoted as "YESNOGRAMMAR," can be defined as follows:

```
YESNOGRAMMAR
[
(yes){true}
(no)   {false}
]
```

In this example, the contents of the grammar are contained within the [ ] brackets. Items within the ( ) brackets are used by the edge comparison module 305 for comparison against the acoustic features extracted from the user's utterances. When the acoustic features similarly compare to the items within the ( ) brackets, the value contained within the { } brackets is passed to the interpretation generator 309.

The edge comparison module 305 utilizes a confidence value generator 307 to determine the level of confidence that measures the correlation of a recognized utterance to a value of an item within the grammar database. High confidence values imply greater similarity between the recognized utterance and the value of an item within the grammar database. Conversely, a low confidence value will imply a poor similarity. In cases where an utterance is not recognized, i.e., the confidence value generator 307 perceives no similarity to any item within the grammar, the edge comparison module will produce an "out of grammar" condition and require the user to re-input their utterance.

Using the simple YESNOGRAMMAR defined above, an exemplary speech recognition process is explained as follows. First, the IVR system 107 prompts the user with the question, "Have you ever been to Colorado?" If the user responds "yes," the speech recognition system 101 recognizes the utterance and passes a "true" result to interpretation generator 309 for output to the appropriate device, e.g., voice browser 205, for system processing. If instead the user responded "maybe," the utterance would not compare to either the "yes" or "no" values within the grammar, YESNO-GRAMMAR. As such, a no recognition situation would result and the edge comparison module would produce an "out of grammar" condition and require the user to re-input their utterance.

In this regard, grammars are used to limit users to those values defined within the grammar, i.e., expected utterances. For instance, if a user was asked to utter a numerical identifier, such as a social security number (SSN), a grammar could limit the first digit to numbers zero through seven since no SSNs begins with an eight or a nine. Accordingly, if a user uttered a SSN beginning with an eight, when the utterance is analyzed by the speech recognition system 101 and compared against the limited grammar, the result will inevitably be an "out of grammar" condition.

Unfortunately, user utterances cannot always be "pigeon holed" into expected utterances. For instance, the speech recognition system 101 utilizing the above YESNOGRAMMAR grammar, would not recognize a user utterance equating to the spoken words of "affirmative" in place of "yes" or "negative" in place of "no." However, to attempt to provide every possible alternative utterance to an expected utterance is impractical, especially when the complexity of the expected utterance increases.

An acute subset of this impracticality arises with the speech recognition of proper nouns, or more specifically, with user names. A simple name grammar, entitled SURNAMES, can be defined as illustrated below:

---
SURNAMES
[
(white w h i t e)           {white}
(brimm b r i m m)           {brimm}
(cage c a g e)     {cage}
(langford l a n g f o r d)  {langford}
(whyte w h y t e)           {whyte}
]
---

In this example, the names, i.e., grammar values, includes a name and a spelling of the name.

Since an almost infinite array of user names exist, typical name grammars only contain a large percentage of possible names. Further, those names stored within the name grammar are typically arranged or otherwise "tuned" to account for name popularity. While these features minimize system resource overwhelming and provide "good" coverage for common names, users who utter those unique names not within the grammar will ultimately produce an "out of grammar" condition. Moreover, users who utilize uncommon pronunciations of common names, e.g., "Whyte" instead of "White," will be presented with the wrong name due to the phonetic similarities and "tuned" nature of name grammars. It is this impracticality that the speech recognition system 101 addresses. The operation of the speech recognition system 101 is next described.

FIG. 4 are flowcharts of a speech recognition process, according to an embodiment of the present invention. In step 401, data (e.g., account information, social security number, or other personalized information) is received from the user, as part of an application or call flow of the IVR system 107, for instance. Through use of a more readily recognizable data, such as an account or social security number, the name associated with the account can be retrieved, per step 403. Next, the user is prompted for a name, as in step 405. The user is requested to say and spell the name.

In step 407, the resultant audio input from the user is received in response to the name prompt. The process then applies, as in step 409, speech recognition to the audio input using a primary name grammar database, such as the name grammar database 103. It is determined, per step 411, whether an out of grammar condition exists. If such a condition occurs, the user is re-prompted for the name, as in step 413. This time, the process applies a high confidence database to output the recognized name (step 415). That is, the process utilizes a secondary name grammar database of high confidence (e.g., confidence database 105) to output the latest recognized name. In one embodiment, the names from an N-best list are combined with the name associated with the account or social security number to generate a supplemental name grammar; this process can be performed dynamically. Decoy names similar to the actual name can also be added to this supplemental name grammar. The level of confidence—i.e., "high"—can be predetermined or pre-set according to the application.

Thereafter, the process determines whether the recognized name matches the retrieved name (as obtained in step 403), per step 417. If a match exists, the latest recognized name is confirmed with the user, per step 421. To confirm, the process, for example, can provide a simple prompt as follows: "I heard <name>. Is that correct?"

If there is not a match, as determined per step 419, the speech recognition process confirms the latest recognized name with the user, and reassesses the name wording (step 423). To confirm, the process, for example, can provide a more directed prompt as follows: "I heard <name>. Are you sure that is the name of the account?"

According to one embodiment, for security purposes, the expected result is not revealed to the caller; the caller must say the expected result and confirm. If the name is not correct, as determined in step 425, the process returns to step 413 to re-prompt the user. This process can be iterated any number of times (e.g., three times); that is, the number of iteration is configurable. If the user exceeds the maximum number of retries, the call can end with a failure event. Upon acknowledging that the name is correct, the process ends.

For the purposes of illustration, this speech recognition process is now explained with respect to three scenarios related to an application for reporting of wages using SSNs as the personalized information. The first scenario involves using only the primary name grammar database 103, without the need to utilize the confidence database 105 (Table 1). The second scenario depicts the case in which the supplemental grammar database, e.g., confidence database 105, is required (Table 2). The last scenario, as shown in Table 3, shows a failed condition.

TABLE 1

| Prompt | User Response |
|---|---|
| First, say or key in your social security number. | 555-00-5555 |
| Now tell me your date of birth. | July 4th, 1976 |
| Thanks. Now, say and spell your first name as it appears on your Social Security Card. | George G-E-O-R-G-E |
| I got your name as <name and spelling recognized from Full Name Grammar> George G-E-O-R-G-E, is that right? | Yes |
| Next, say and spell your last name as it appears on your Social Security card. | Smith, S-M-I-T-H |
| I got your name as <name and spelling recognized from Full Name Grammar> Smith, S-M-I-T-H, is that right? | Yes |
| Some people have another last name—for example, a professional or maiden name—that might be listed under their social security number. Do you have another last name? Please say Yes or No. | No |
| Hold on while I check our database. It may take a few seconds. | |
| Next, I need the wages earned in <past month> <year of past month> Please tell me the total wages in dollars and cents. | $279.30 |
| Hold on while I send the information to the Social Security Administration. | |
| OK, those wages were reported. Thanks for calling the SSA Monthly Wage Reporting line. | |

TABLE 2

| Prompt | User Response |
|---|---|
| First, say or key in your social security number. | 777-00-7777 |
| Now tell me your date of birth. | July 4th, 1976 |
| Thanks. Now, say and spell your first name as it appears on your Social Security Card. | Tomas T-O-M-A-S |
| The Name I heard was <name and spelling recognized from Full Name Grammar> Thomas T-H-O-M-A-S, is that the name as it appears on your Social Security Card? | No |
| Let's try again, Right after you tell me your last name, spell it too. Like this, "John, J-O-H-N". | Tomas T-O-M-A-S |
| The name I heard was <name and spelling recognized from Dynamically Built Grammar> Tomas T-O-M-A-S, is that right? | Yes |
| Next, say and spell your last name as it appears on your Social Security card. | Smith, S-M-I-T-H |
| I got your name as Smith, S-M-I-T-H, is that right? | Yes |
| Some people have another last name—for example, a professional or maiden name—that might be listed under their social security number. Do you have another last name? Please say Yes or No. | No |
| Hold on while I check our database. It may take a few seconds. | |
| Next, I need the wages earned in <past month> <year of past month> Please tell me the total wages in dollars and cents. | $1207.30 |
| Hold on while I send the information to the Social Security Administration. | |
| OK, those wages were reported. Thanks for calling the SSA Monthly | |

TABLE 3

| Prompt | User Response |
|---|---|
| First, say or key in your social security number. | 888-00-8888 |
| Now tell me your date of birth. | July 4th, 1977 |
| Thanks. Now, say and spell your first name as it appears on your Social Security Card. | Kelly K-E-L-L-Y |
| The Name I heard was <name and spelling recognized from Full Name Grammar> Kelly K-E-L-L-Y, is that the name as it appears on your Social Security Card? | No |
| Let's try again, Right after you tell me your last name, spell it too. Like this, "John, J-O-H-N". | Kellie, K-E-L-L-I-E |
| The name I heard was <name and spelling recognized from Dynamically Built Grammar> Kellie, K-E-L-L-I-E, is that the name as it appears on your Social Security Card? | Yes |
| Next, say and spell your last name as it appears on your Social Security card. | Smith, S-M-I-T-H |
| I got your name as Smith, S-M-I-T-H, is that right? | Yes |
| Some people have another last name—for example, a professional or maiden name—that might be listed under their social security number. Do you have another last name? Please say Yes or No. | No |
| Hold on while I check our database. It may take a few seconds. | |
| I'm sorry, we were unable to process your request. Please check your information and try again later. | |

Figure 4A:
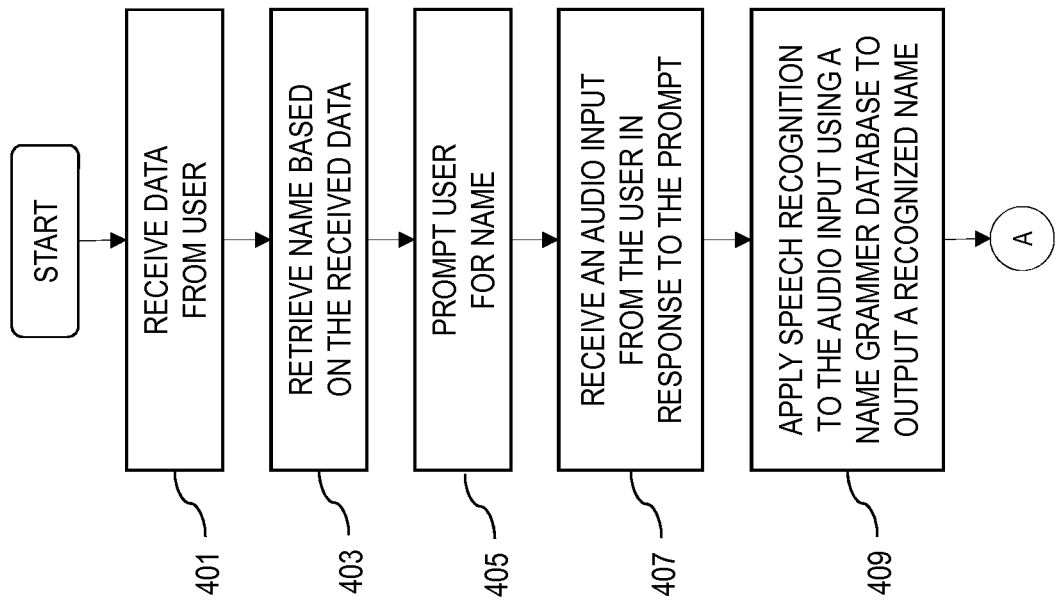
FIGS. 4A and 4B are flowcharts of a speech recognition process, according to an embodiment of the present invention.
Figure 4B:
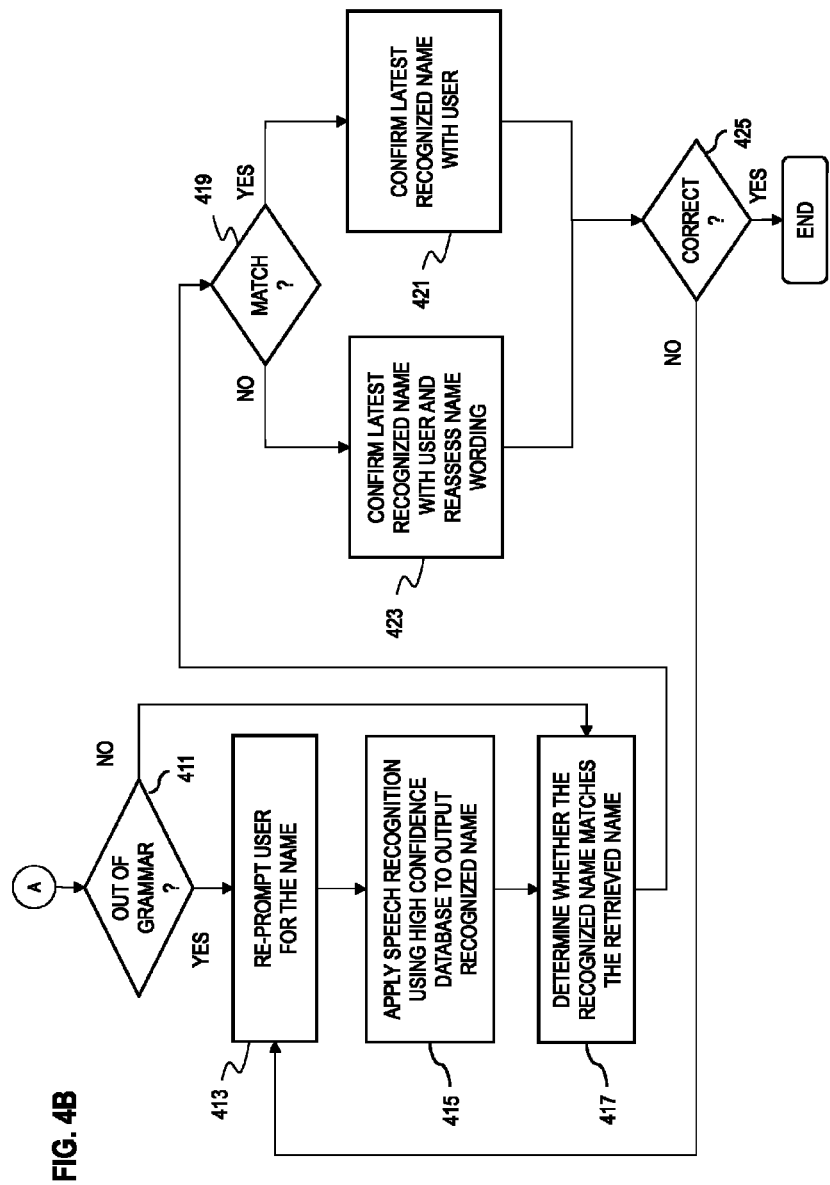

The speech recognition process of FIGS. 4A and 4B, therefore, can be utilized to improve conventional speech recognition say and spell name capture. This approach allows the user's or caller's name to be acquired using another piece of information, or a data combination, such as a birth date and account or social security number. This actual name may be obtained and used in a supplemental name grammar to aid in the recognition of the caller's name.

The processes described herein for providing speech recognition may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
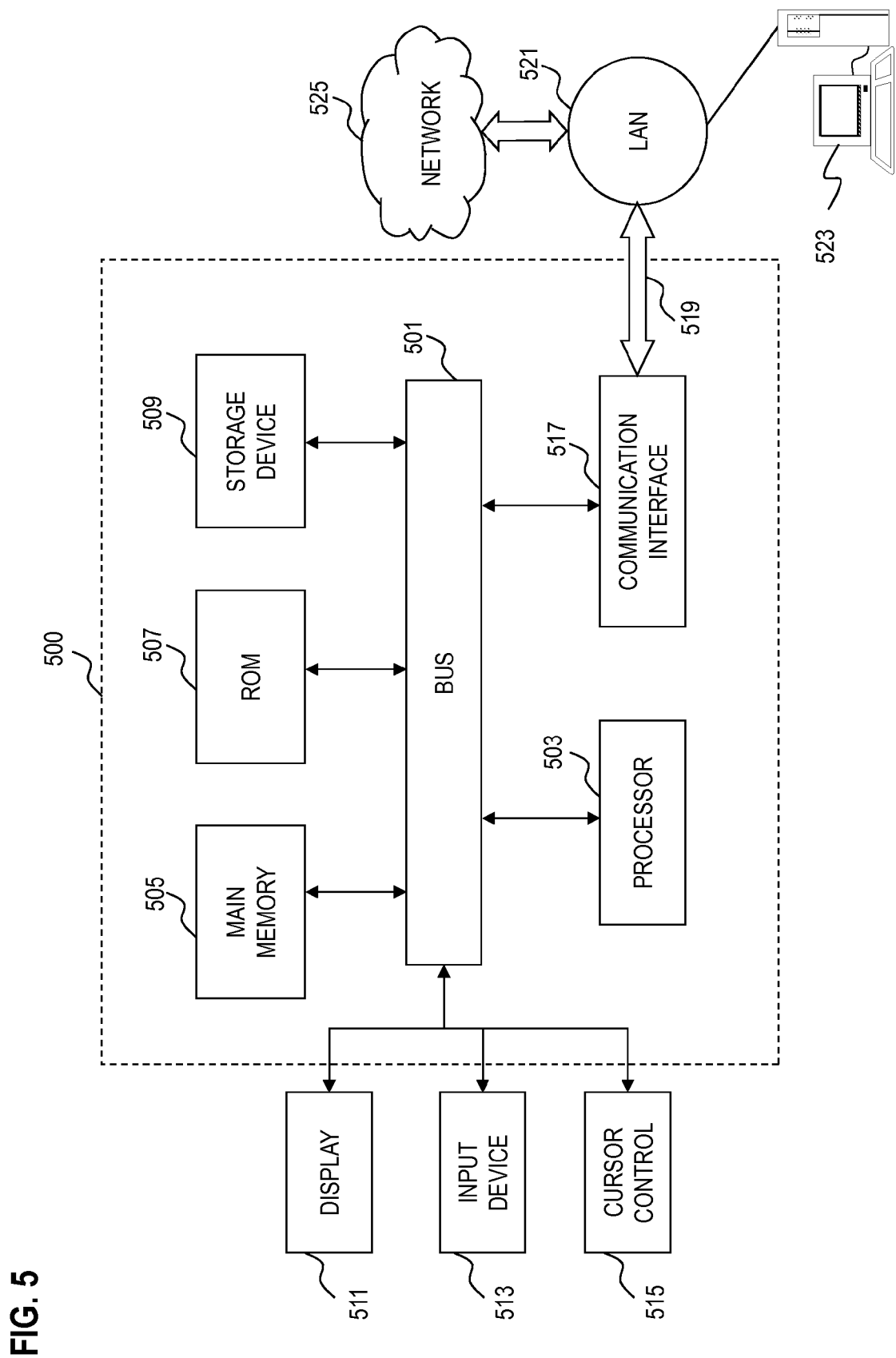
FIG. 5 is a diagram of a computer system that can be used to implement various embodiments of the present invention.

FIG. 5 illustrates a computer system 500 upon which an embodiment according to the present invention can be implemented. For example, the processes described herein can be implemented using the computer system 500. The computer system 500 includes a bus 501 or other communication mechanism for communicating information and a processor 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for controlling cursor movement on the display 511.

According to one embodiment of the invention, the processes described herein are performed by the computer system 500, in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the present invention. Thus, embodiments of the present invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Model (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although a single communication interface 517 is depicted in FIG. 5, multiple communication interfaces can also be employed.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and the network 525 both use electrical, electromagnetic, or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an embodiment of the present invention through the network 525, the local network 521 and the communication interface 517. The processor 503 may execute the transmitted code while being received and/or store the code in the storage device 509, or other non-volatile storage for later execution. In this manner, the computer system 500 may obtain application code in the form of a carrier wave.

The term "computer-readable medium" as used herein refers to any medium that participates in providing instructions to the processor 503 for execution. Such a medium may take many forms, including but not limited to non-volatile media, volatile media, and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that flow. The specification and the drawings are accordingly to be regarded in an illustrative rather than restrictive sense.

What is claimed is:

1. A method comprising:
receiving a first audio input representing a combination of a spoken name of a user and spoken letters of the name of the user;
applying, via at least one processor, speech recognition to the first audio input using a name grammar database to output a combination of a name and letters of the name;
wherein the speech recognition includes determining, via the at least one processor, whether there is a combination of a name in the name grammar database and letters of the name in the name grammar database, which matches the combination of the spoken name of the user and spoken letters of the name of the user, wherein a determination that there is no combination in the name grammar database, which matches the combination of the spoken name of the user and spoken letters of the name of the user indicates an out of grammar condition;
receiving, if an out of grammar condition exists, a second audio input representing the combination of the spoken name of the user and the spoken letters of the name of the user; and
applying, via the at least one processor, speech recognition to the second audio input using a confidence database that is separate from the name grammar database.

2. A method according to claim 1, wherein the confidence database is configured to store a subset of entries of the name grammar database.

3. A method according to claim 2, wherein the confidence database includes one or more entries that are derived from the name grammar database and are ranked by confidence level.

4. A method according to claim 2, further comprising:
determining additional entries for the confidence database using a decoy application.

5. A method according to claim 1, further comprising:
determining a confidence level of a comparison between the retrieved combination and the recognized combination.

6. A method according to claim 1, further comprising:
generating a prompt to acquire data relating to the user, wherein the data includes one of business information or personal information, and is used to obtain the retrieved combination.

7. A method according to claim 1, further comprising:
confirming the recognized name with the user.

8. A method according to claim 1, further comprising:
determining a failed condition if no match is found with the retrieved combination after a predetermined number of iteratively prompting the user for the spoken name and the spoken letters of the name.

9. A method according to claim 1, further comprising:
generating a first prompt to acquire the first audio input from the user; and
selectively generating, based on the determination, a second prompt to acquire the second audio input from the user.

10. An apparatus comprising:
at least one processor; and
at least one memory including computer program code for one or more programs,
the at least one memory and the computer program code configured to, with the at least one processor, cause the apparatus to perform at least the following,
receive a first audio input representing a combination of a spoken name of a user and spoken letters of the name of the user,
apply speech recognition to the first audio input using a name grammar database to output a combination of a name and letters of the name,
wherein the speech recognition includes determining whether there is a combination of a name in the name grammar database and letters of the name in the name grammar database, which matches the combination of the spoken name of the user and spoken letters of the name of the user, wherein a determination that there is no combination in the name grammar database, which matches the combination of the spoken name of the user and spoken letters of the name of the user indicates an out of grammar condition,
receive, if an out of grammar condition exists, a second audio input representing the combination of the spoken name of the user and the spoken letters of the name of the user, and
apply speech recognition to the second audio input using a confidence database that is separate from the name grammar database.

11. An apparatus according to claim 10, wherein the confidence database is configured to store a subset of entries of the name grammar database.

12. An apparatus according to claim 11, wherein the confidence database includes one or more entries that are derived from the name grammar database and are ranked by confidence level.

13. An apparatus according to claim 11, wherein the apparatus is further caused to:
determine additional entries for the confidence database using a decoy application.

14. An apparatus according to claim 10, wherein the apparatus is further caused to:
determine a confidence level of a comparison between the retrieved combination and the recognized combination.

15. An apparatus according to claim 10, wherein the apparatus is further caused to:
generate a prompt to acquire data relating to the user, wherein the data includes one of business information or personal information, and is used to obtain the retrieved combination.

16. An apparatus according to claim 10, wherein the apparatus is further caused to:
confirm the recognized name with the user.

17. An apparatus according to claim 10, wherein the apparatus is further caused to:
determine a failed condition if no match is found with the retrieved combination after a predetermined number of iteratively prompting the user for the spoken name and the spoken letters of the name.

18. An apparatus according to claim 10, wherein the apparatus is further caused to:
generate a first prompt to acquire the first audio input from the user; and
selectively generate, based on the determination, a second prompt to acquire the second audio input from the user.

19. A system, comprising:
a voice response unit, including a processor, configured to receive a first audio input representing a combination of a spoken name of a user and spoken letters of the name of the user; and
a speech recognition logic, executed by another processor, configured to output a combination of a name and letters of the name, responsive to the first audio input, and in accordance with a name grammar database;
wherein the voice response unit is further configured to receive a second audio input representing a reutterance of the combination of the spoken name of the user and the spoken letters of the name of the user if a determination is made that there is no combination in the name grammar database, which matches the combination of the spoken name of the user and spoken letters of the name of the user, and wherein the speech recognition logic is further configured to recognize the second audio input using a confidence database that is separate from the name grammar database.

20. A system according to claim 19, wherein the confidence database is configured to store a subset of entries of the name grammar database.

\* \* \* \* \*